G. OTTO & T. SIMON.
DRAFT ATTACHMENT FOR VEHICLES.

No. 187,410. Patented Feb. 13, 1877.

Witnesses:
Michael Ryan
Fred Haynes

Gustav Otto
Theodor Simon
by their Attorneys
Brown & Allen

UNITED STATES PATENT OFFICE.

GUSTAV OTTO, OF JERSEY CITY, NEW JERSEY, AND THEODOR SIMON, OF NEW YORK, N. Y.

IMPROVEMENT IN DRAFT ATTACHMENTS FOR VEHICLES.

Specification forming part of Letters Patent No. 187,410, dated February 13, 1877; application filed December 27, 1876.

*To all whom it may concern:*

Be it known that we, GUSTAV OTTO, of Jersey City, in the county of Hudson and State of New Jersey, and THEODOR SIMON, of the city, county, and State of New York, have invented an Improvement in Draft Attachments for Vehicles, and we do hereby declare that the following is a full, clear, and exact description of the same, reference being had to the accompanying drawing, which forms a part of this specification.

Our invention is intended to supply an improved means whereby horses or other draft animals attached to vehicles may be relieved from the shocks and strains to which they are subjected in drawing vehicles over rough roads, and in starting the same when stopped.

This invention consists of a novel construction and combination of parts which will be fully hereinafter described and claimed, a preliminary explanation being therefore deemed unnecessary.

Figure 1:
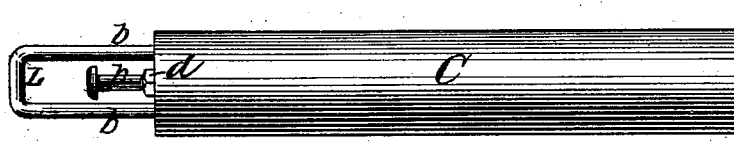
Figure 3:
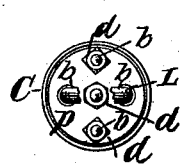
Figure 2:

Figure 1 in the accompanying drawing is a side view of our draft attachment slightly extended. Fig. 2 is a side view of the same unextended, with the protecting-case removed to show interior construction and arrangement. Fig. 3 is an end view of the attachment, and Fig. 4 is a central cross-section of the same.

The series of compression-springs *a*, shown in Figs. 2 and 3, are preferably made of coiled steel wire, but rubber or other material may be employed. Said springs are supported longitudinally, and prevented from buckling by rods *b* passing through said springs; and the springs are supported in relation with each other by plates *p*, the said rods *b* passing through holes formed in said plates *p*.

Each of the rods slides freely in either direction through the hole in one of the plates through which it passes, but it is prevented from sliding in the opposite plate by a thread on said rod and a nut, *d*, fitted to said thread, or by riveting or otherwise. Two of said rods, *b*, are joined at each end of the attachment to form a draw-loop, L, by which the draft attachment may be attached to other attachments by hooks, chains, or otherwise.

Figure 4:
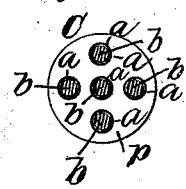

The whole is supplied with a protecting case or sheath, C, Figs. 1, 3, and 4, said case or sheath being screw-threaded on the inside at one extremity, said thread in said case being screwed onto one of the plates *p* which is made screw-threaded for this purpose, as shown at *t*, Fig. 2.

We prefer to make the springs *a* of different lengths, so that they shall be compressed successively, and thus more gradually increase the resistance of the draft attachment.

The draft attachment, as described, may be interposed between the traces and the whiffletrees which are used to attach animals to vehicles, and also between the hames of a harness and the neck-yoke, to form some part of the flexible connection between the collar of the harness and the pole of such vehicle.

When so interposed, these draft attachments greatly relieve the attached animals from strains and shocks, and enable them to apply their full momentum to starting a vehicle without breaking the harness. They are cheaply made, and can be applied to use in connection with all kinds of vehicles without entailing any alteration in the construction of the vehicles; and, while possessing a graduated resilience, they afford a sufficiently rigid attachment for all draft purposes.

Instead of attaching both draw-loops to supporting-rods *b*, one draw-loop may be attached to the protecting case, the latter being made stronger for the purpose.

I claim—

In combination with the draw-loops L L, the series of rods B, the springs *a*, arranged upon the said rods, and the heads *p p*, one of which is screw-threaded, the tubular casing having an internal screw-thread adapted to the screw-threaded head, substantially as described.

GUSTAV OTTO.
THEO. SIMON.

Witnesses:
BENJAMIN W. HOFFMAN,
FRED. HAYNES.